O. MALCHER.
CALCULATING MACHINE.
APPLICATION FILED MAR. 19, 1914.
1,318,395.
Patented Oct. 14, 1919.
7 SHEETS—SHEET 1.
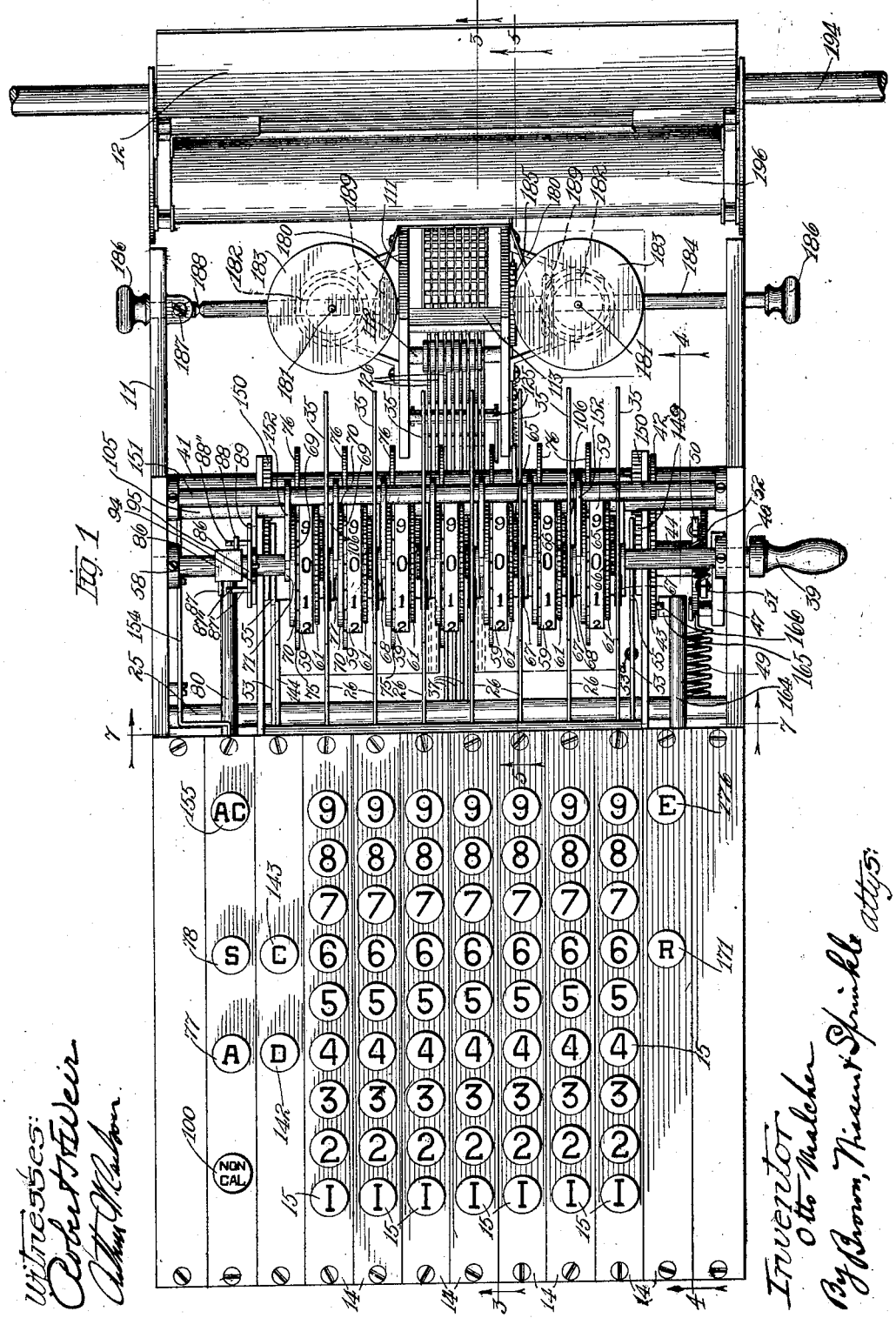

O. MALCHER.
CALCULATING MACHINE.
APPLICATION FILED MAR. 19, 1914.
1,318,395.
Patented Oct. 14, 1919.
7 SHEETS—SHEET 2.
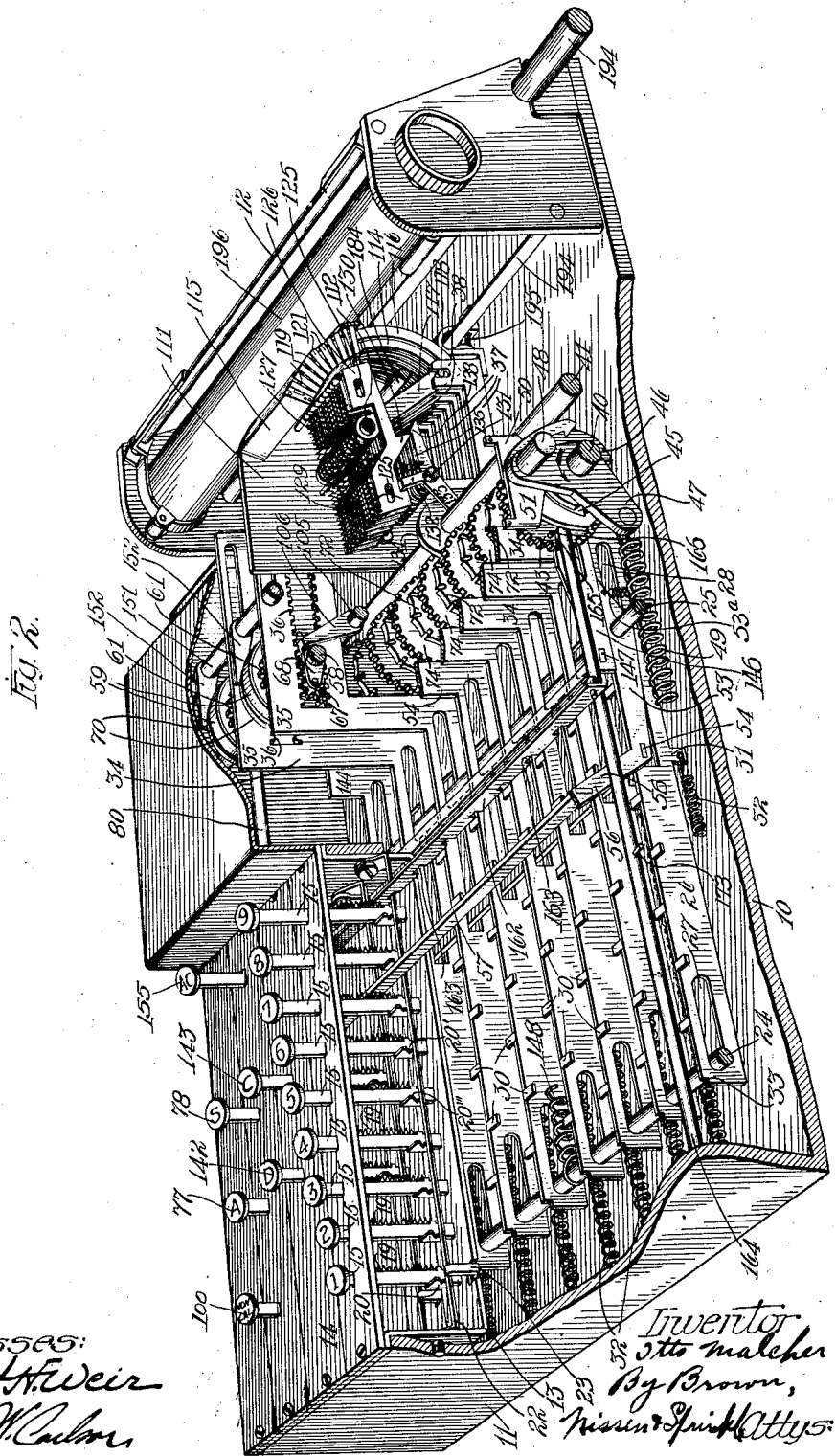

O. MALCHER.
CALCULATING MACHINE.
APPLICATION FILED MAR. 19, 1914.
1,318,395.
Patented Oct. 14, 1919.
7 SHEETS—SHEET 3.
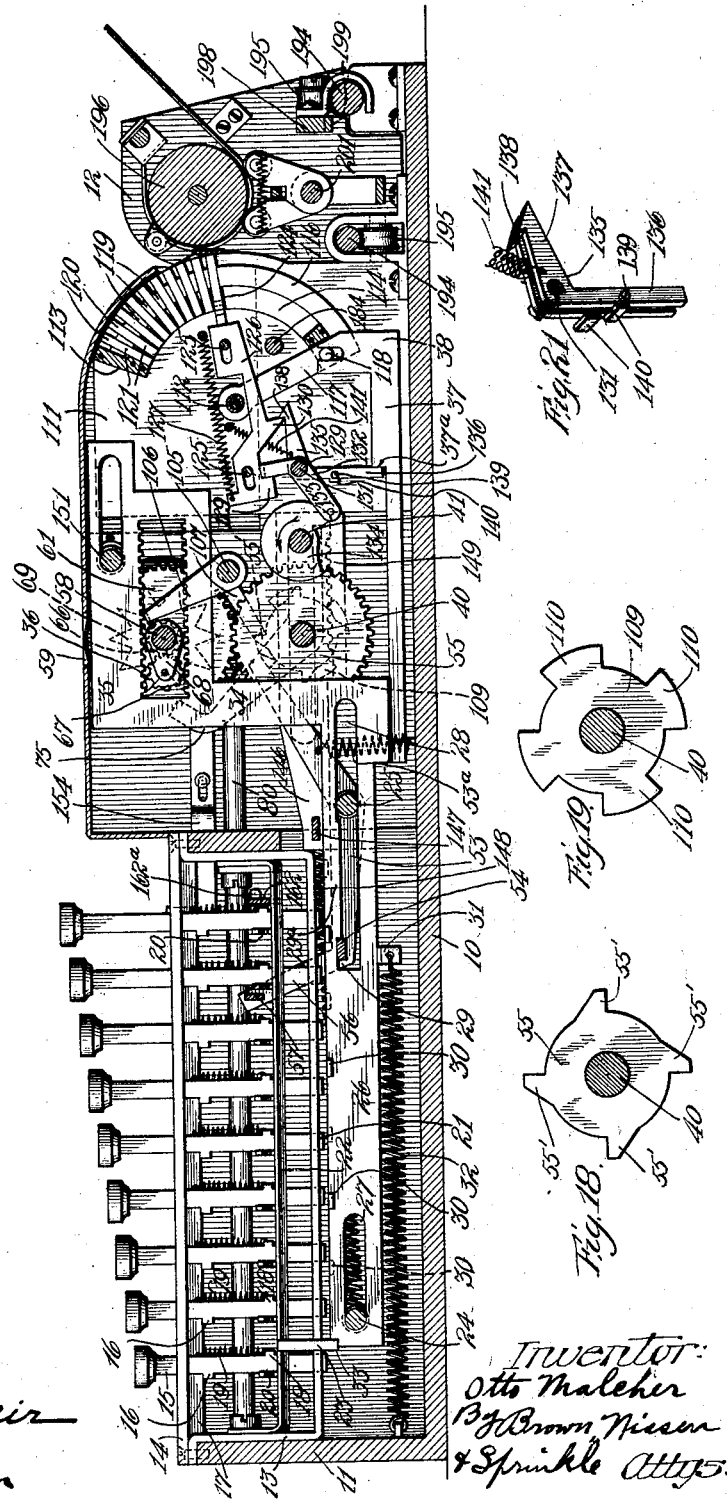

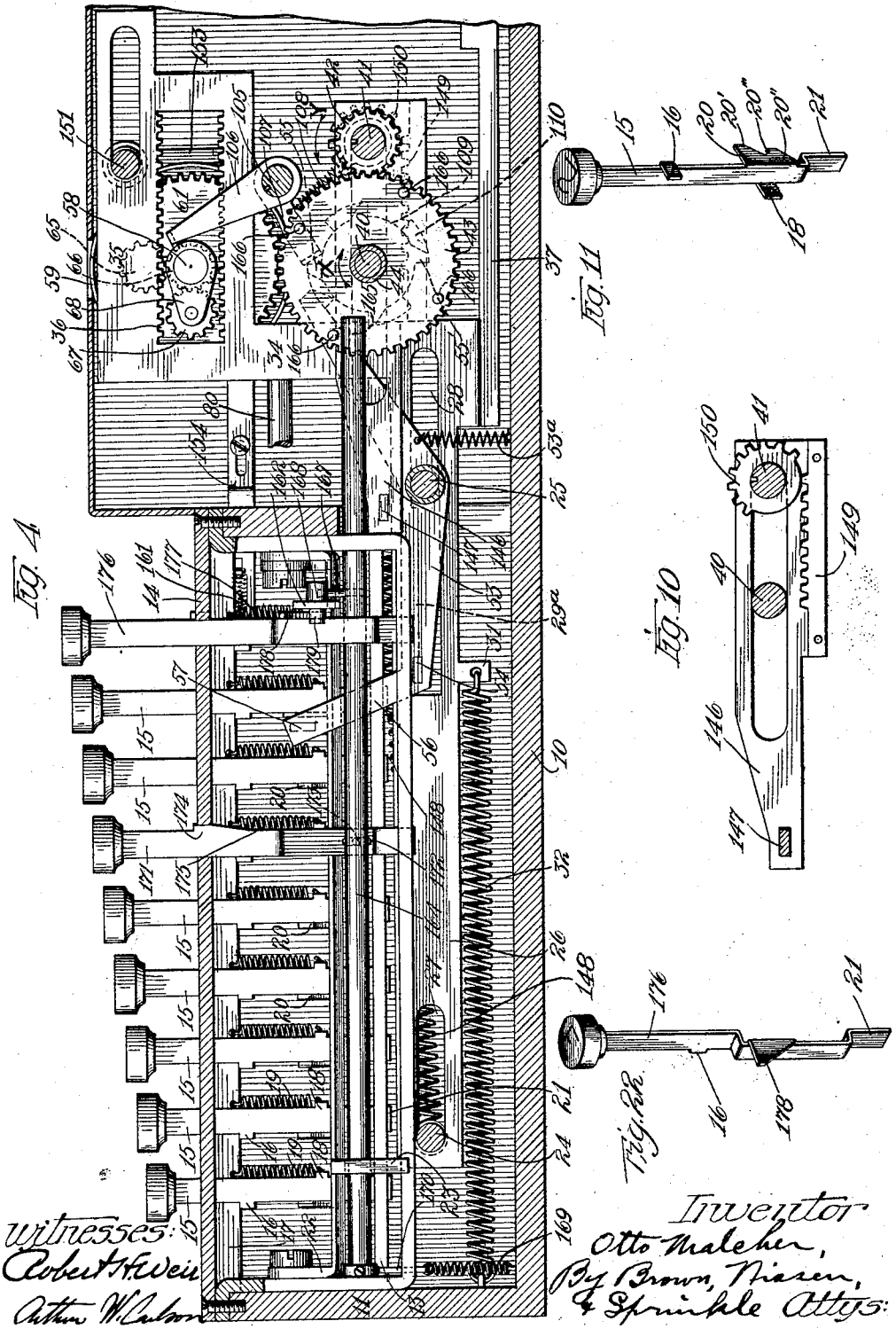

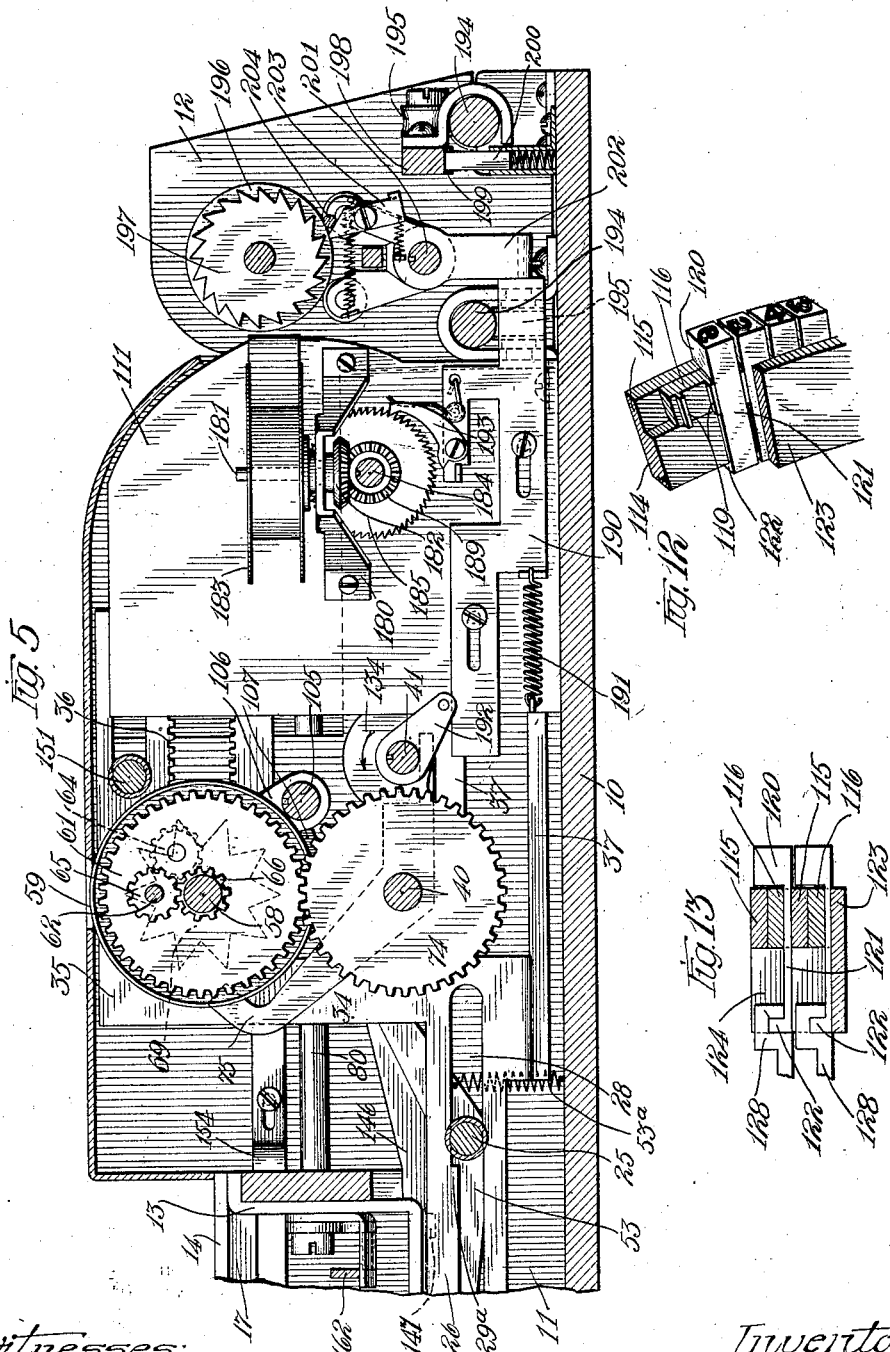

O. MALCHER.
CALCULATING MACHINE.
APPLICATION FILED MAR. 19, 1914.
1,318,395.
Patented Oct. 14, 1919.
7 SHEETS—SHEET 6.
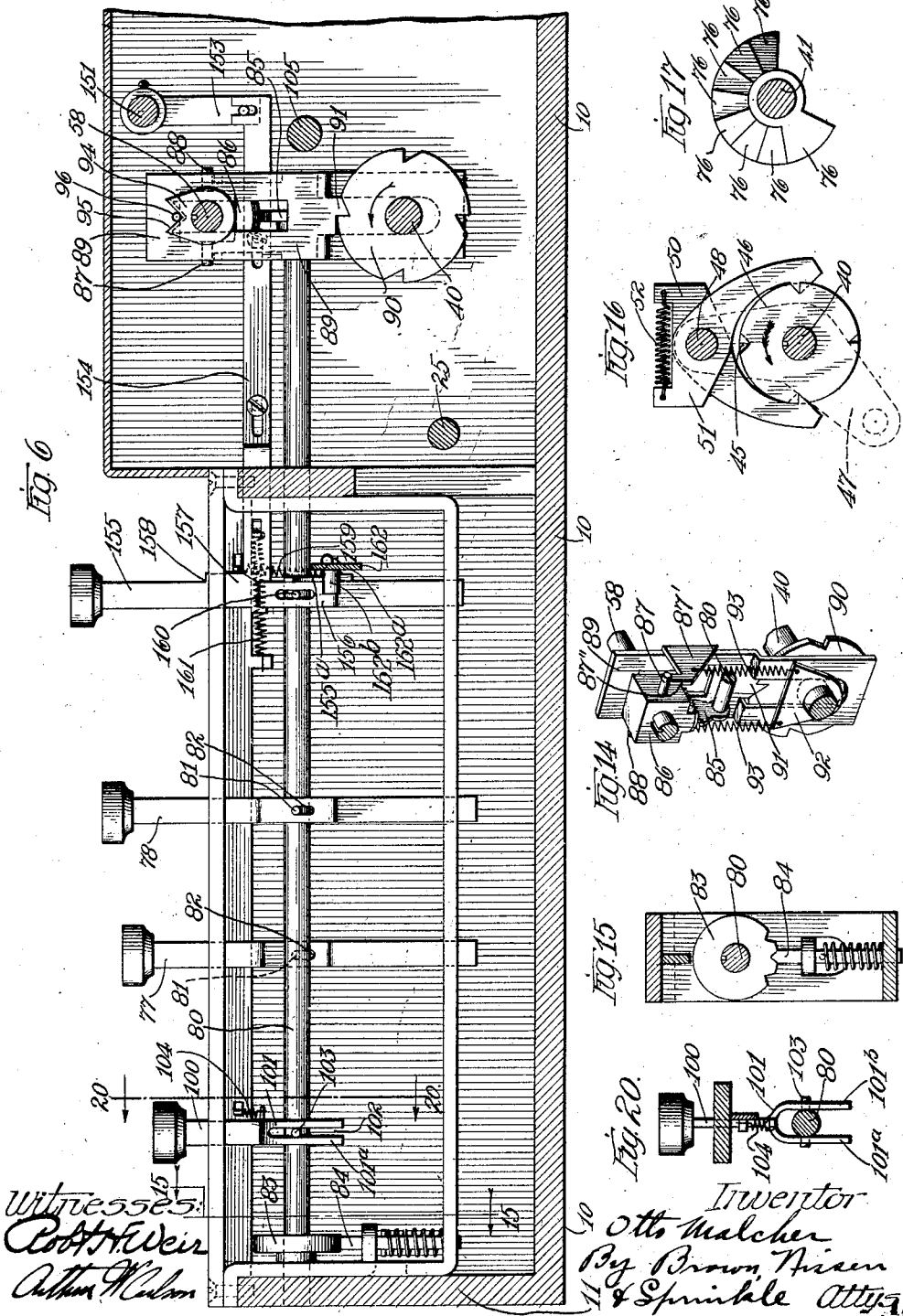

O. MALCHER.
CALCULATING MACHINE.
APPLICATION FILED MAR. 19, 1914.
1,318,395.
Patented Oct. 14, 1919.
7 SHEETS—SHEET 7.
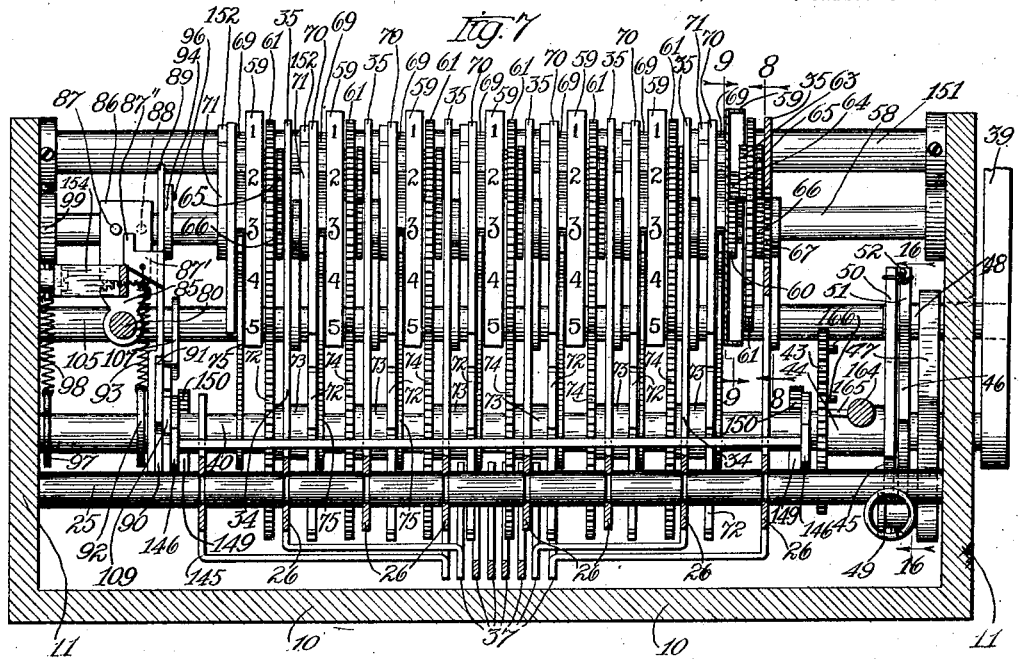
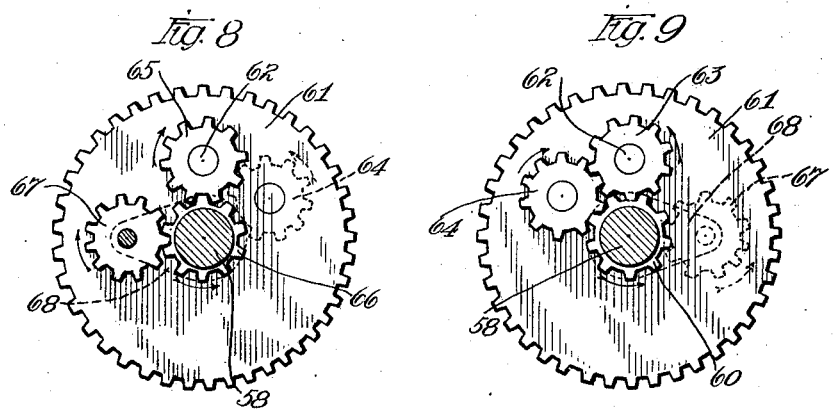

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

CALCULATING-MACHINE.

1,318,395.  Specification of Letters Patent.  Patented Oct. 14, 1919.

Application filed March 19, 1914. Serial No. 825,782.

*To all whom it may concern:*

Be it known that I, OTTO MALCHER, a citizen of the United States, residing at Chicago, in the county of Cook and State of Illinois, have invented certain new and useful Improvements in Calculating-Machines, of which the following is a specification.

This invention relates to improvements in calculating machines and is designed primarily to produce machines which will embody all of the features of the machines heretofore, with such improvements and additional features as are hereinafter set forth, and at the same time cheapen the cost of manufacture of the product.

With the above and other objects in view as will be hereinafter apparent, this invention consists in the construction, combination and arrangement of parts all as hereinafter more fully described, claimed and illustrated in the accompanying drawings, wherein—

Figure 1 is a plan view of the machine forming the subject-matter of the present invention, with the casing thereof removed, illustrating a keyboard, a totalizer, printing mechanism, etc.;

Fig. 2 is a perspective view of the entire machine, parts thereof being broken away to illustrate the coöperation of the keys with the racks and totalizer, and also the printing mechanism;

Fig. 3 is a longitudinal section taken along the line 3—3 of Fig. 1;

Fig. 4 is a similar view taken along the line 4—4 of Fig. 1;

Fig. 5 is a section taken along the line 5—5 of Fig. 1, illustrating the details of the totalizer and the ribbon control;

Fig. 6 is a sectional view through the machine, illustrating the positioning of the adding and subtracting and automatic clearing keys and the coöperation thereof with the totalizer shafts;

Fig. 7 is a transverse section taken along the line 7—7 of Fig. 1, illustrating the details of the totalizer;

Fig. 8 is a vertical sectional view taken along the line 8—8 of Fig. 7, illustrating one side of a totalizer unit;

Fig. 9 is a similar section taken along the line 9—9 of Fig. 7, illustrating the opposite side of a totalizer unit;

Fig. 10 is an elevation illustrating the mechanism for returning the racks and slides to their initial positions after a calculation;

Fig. 11 is a perspective view of one of the denominational keys;

Fig. 12 is a perspective view, with parts broken away, of one of the printing segments;

Fig. 13 is a sectional view taken through two adjacent segments, illustrating the coöperation of said segments with the type and hammer;

Fig. 14 is a perspective view of the setting mechanism for the totalizer, whereby the same is made operative for either addition or subtraction, or inoperative, as the case may be;

Fig. 15 is a section taken along the line 15—15 of Fig. 6, illustrating a positioning lock for the adding and subtracting setting mechanism;

Fig. 16 is a view illustrating means for driving the machine in general, and the primary drive shaft thereof in particular, being a section taken along the line 16—16 of Fig. 7;

Fig. 17 is an end elevation of the secondary drive shaft of the machine, illustrating the cams for truing the number wheels of the totalizer;

Fig. 18 is a side elevation of one of the cams for operating the rack lock and release;

Fig. 19 is a view of the cam for operating the lock for the totalizer during the setting thereof;

Fig. 20 is a section taken along the line 20—20 of Fig. 6 and illustrates in detail the "non-calculate" key, whereby the totalizer is rendered inactive during the operation of the machine from printing only;

Fig. 21 is a perspective view of one of the bell cranks which acts as a secondary lock for the hammers of the printing mechanism;

Fig. 22 is a detail view of the error key.

The calculating machine constituting the present invention comprises a flexible keyboard, wherein the numbers are set up; a reversible totalizer, and a plurality of racks for operating said totalizer, the flexible keyboard aforesaid acting as stops for said racks and limiting the operation of the totalizer, thereby providing for the varied motion of the elements thereof necessary in calculating. A main drive shaft is provided which rotates a quarter of a cycle for each calculation, during which the racks are released, allowing the machine to place the number set up on the keyboard in the totalizer and at the same time set up the printing mechanism for listing the numbers or items. A secondary drive shaft is provided which rotates a complete cycle at each calculation, subsequent to the movement of the main drive shaft, which movement causes the printing mechanism to list the items or numbers and returns all of the elements of the mechanism to their initial positions.

The machine comprises a base plate 10 provided with the casing 11 which completely surrounds the mechanism of the machine with the exception of the carriage 12 and its associated elements at the rear of the machine. The machine also embodies a cover which is readily removable. It will be apparent that the construction of the base plate, casing and cover is merely a matter of design and manufacture, and forms no part of the present invention.

*Keyboard.*

The keyboard of the present invention is a flexible or self-correcting keyboard; that is to say, if it is desired, after an insertion has been made by depressing a key to make another insertion by depressing another key in the same decimal order, the orginally depressed key is automatically released upon the operation of the second key. Furthermore, the keyboard is constructed in units, the keys of each decimal order constituting a unit of said keyboard which is bodily independent of the remaining units of the keyboard.

Each decimal order of the keyboard comprises a U-shaped frame 13, Figs. 2, 3 and 4 the terminals or the arms of which are secured to the upper edges of the casing 11 and to a top plate 14, said units resting one against the other and forming in combination, when secured to the casing aforesaid, a complete mechanism. The top plate 14 of each decimal order is pierced by nine key stems 15, which extend through the U frame 13, said frame in combination with the plate 14 acting as a guide for the keys. In Fig. 11 is illustrated one of the keys, which comprises a stem 15 provided upon one side thereof with a stop 16, which contacts with a bar 17 interposed between the arms of the frame 13 adjacent to the top plate 14. An orificed projection 18 is formed on each key stem, to which is secured a spring 19, the upper terminal of which is attached to the bar 17. Adjacent to the lower terminal of the stem of the key is the key lock 20, which comprises a projection formed on one side of the key, having two inclined faces 20' and 20'', the upper face 20' being longer than the lower inclined face 20'', said faces being separated by a lock notch 20'''. The lower terminals of the stems of the keys, with the exception of the "1" key in each order, which is straight, are offset to form the rack stops 21, said stops being projected into the path of movement of the racks.

A lock bar 22 is pivoted between the arms of the frame 13 and performs the double purpose of locking the keys in depressed position and locking the racks, as will be hereinafter more fully described, against movement prior to the depression of the keys. This lock bar carries a downwardly projecting lock 23 at its forward terminal which, prior to the depression of any key, lies directly within the path of the coöperating rack, as will be hereinafter more fully described, and prevents liability of any movement on the part of the latter prior to the depression of any one of the keys in that particular decimal order. It will be noticed by reference to Figs. 2, 3 and 4, that the body of this lock bar 22 rests at an angle to the face of the key stems 15.

Upon the depression of any one key in a series or decimal order, the inclined surface or face 20'' of the key lock 20 operates against the lock bar 22 and causes the same to ride outwardly and drop into the lock notch 20'''. The lock bar 22, coöperating with the lock notch 20''', locks the key in its depressed position and the rack stop 21 thereof in the path of the coöperating rack, as will be hereinafter apparent. The depression of another key in the series causes the inclined face 20'' of that key to pass the lock bar 22, and the inclined face 20' thereof to operate against said lock bar; and, as said face 20' is of greater length than the face 20'', said lock bar will ride outwardly upon the face 20' of the second depressed key and thus be moved from engagement with a lock notch 20''' of the first depressed key, permitting the spring 19 to act thereon. This returns the first depressed key to its initial position, while the second depressed key when the pressure is removed therefrom moves slightly in an upward direction until the lock bar 22 gravitates into the lock notch 20'''. Hence, after the depression of one key in a series, a second key in the same series or decimal order may be depressed, releasing said first depressed key and locking the second key in an operative position.

The units for all the decimal orders of the keyboard are identical in construction and constitute what might be termed the keyboard of the machine, though said keyboard also involves totalizer setting keys, an automatic clearing key, an error key and a repeat key, all of which elements, though forming part of the keyboard, will be described specifically in connection with the mechanism with which they coöperate.

Racks.

A reciprocating rack is employed for each decimal order of the keyboard, said rack reciprocating directly under its coöperating row of keys and adapted to be stopped in various positions by the rack stops 21 of the keys. The movement of these racks forwardly until they contact with the coöperating rack stop 21 operates the totalizer for the calculation, and at the same time sets up the printing mechanism.

Interposed between the longitudinal sides of the casing 11 are a pair of shafts 24 and 25, Figs. 2, 3, 4, 5, and 7, the shaft 24 being located adjacent to the forward terminal of the keyboard, while the shaft 25 is located adjacent to the rear terminal thereof. Mounted upon these two shafts and under each decimal order of the keys is a slide 26, said slide being provided with a slot 27 at its forward end and a slot 28 at its rearward terminal, for the reception of said shafts and the reciprocation of the slides thereon. The rear slot 28 is provided at its forward terminal with an enlargement 29 (Fig. 3), which forms a projection 29$^a$ in said slot whereby the slides may be locked, as will be hereinafter apparent. These slides are placed on edge in the machine and are provided with a plurality of projections 30 thereon, which extend horizontally from the upper edge of said slides upon alternate sides thereof. These projections are adapted to contact with the rack stops 21 of the keys to limit the movement of the slides 26 and consequently the racks, dependent upon the key depressed, thereby supplying the necessary varied movement to the racks. Each slide is also provided with a projection 31 on its lower edge, to which is secured a spring 32, said spring extending to the forward wall of the casing, where it is secured. These springs act upon the slides 26 to draw them toward the forward end of the machine when the same are released, said springs being the source of power by means of which the calculations are performed. The forward terminals of the slides are provided with depressions 33, which coöperate with the projecting locks 23 of the lock bars 22 to lock said slides until a key is depressed in the decimal order for that slide, after which the lock bar 22 is swung outwardly and the projecting lock 23 is likewise moved from the path of the slide 26. These depressions 33 also coöperate with "1" keys of the keyboard to take the place of the stops 30, and as the "1" keys are straight the depression thereof causes the ends to extend into the depressions 33 when the slides move forwardly. The rear terminals of the slides are provided with the vertical extensions 34, which carry at their upper terminals the horizontal extensions 35, in which are formed the racks 36. These racks 36 are formed on each side of a slot arranged within each extension 35 and are double racks, for the purposes of carrying out addition and subtraction without changing the direction of operation of the elements of the machine other than the totalizer itself.

In order to connect the slides and racks with the printing mechanism so that the same may be set by the movement of the slides, the latter are provided with the extensions 37 which project to the rear of the machine and carry at their rear terminals the bifurcated uprights 38, Figs. 2 and 3. Each upright 38 is connected directly to a printing segment and takes the same varied movement as does its coöperating slide and rack, and hence sets the printing mechanism to correspond to the number placed in the totalizer.

The extensions 37 are offset toward the center of the machine from both sides thereof, as illustrated in Fig. 7, in order to have the connections between the racks and the printing segments consolidated, as necessitated by the decimal orders of the numbers.

When a key of a series is depressed, the rack stop 21 thereof will project into the path of one of the projections 30 upon the slides, and when said projection contacts with said stop the rack will be held stationary. The movement of the rack is dependent upon the key depressed; that is to say, the rack will have a larger movement when the "9" key is depressed than when the "1" key is depressed, thus imparting a varied movement to the rack, which varied movement is imparted directly, by means of the extension 37, to the printing mechanism.

Primary and secondary drive shafts.

The power of the present machine is obtained from a crank 39 Figs. 1 and 7 located upon the exterior of and to one side of the machine. It is the purpose of this crank to impart a quarter of a turn to the primary drive shaft 40 which is interposed between the side walls of the casing. It can be readily understood that though the present machine receives its power manually, a suitable motor or other mechanical power-imparting mechanism can be substituted for the crank.

Extending completely across the machine and parallel to said primary drive shaft 40 is a secondary drive shaft 41, which has keyed thereto a gear 42 which meshes with a gear 43 loosely mounted upon the primary drive shaft 40 through the medium of a sleeve 44 Figs. 1 and 4, which sleeve is connected at its outer terminal to a ratchet 45 Figs. 2, 7 and 16, which is likewise loosely mounted upon the primary drive shaft 40. A second ratchet 46 is keyed to the primary drive shaft to rotate therewith. Loosely mounted upon the primary drive shaft 40 and adjacent to the ratchet 46 is a bell crank 47 Fig. 2, one arm of which is provided with a lug 48 which projects through a curved slot in the adjacent wall of the casing 11 and connects upon the exterior of said wall with the crank 39, which is loosely mounted upon a projecting terminal of the primary drive shaft 40 Figs. 2 and 7. It will thus be seen that as the crank 39 is oscillated about the primary drive shaft 40, a similar movement will be imparted to the bell crank 47. The opposite arm of the bell crank is connected to a coil spring 49 which extends to the forward part of the machine, where it is secured to the casing 11. This spring acts upon the bell crank to return the same to its initial position after the crank 39 has been pulled forwardly. Two opposed pawls 50, 51 Figs. 2 and 16 are mounted upon an extension of the lug 48 adjacent to the bell crank 47. The pawl 50 is adapted to coöperate with the ratchet 45, while the pawl 51 is adapted to coöperate with the ratchet 46. The terminals of the pawls are connected by the spring 52, which forces the pawls into engagement with their respective ratchets.

When the crank 39 is pulled toward the forward end of the machine, the pawl 51 engages the respective ratchet 46 and rotates the primary drive shaft 40 a quarter of a revolution in the direction of the arrow in Figs. 2, 6 and 16, as the ratchet 46 is keyed to the primary drive shaft 40. When the handle is released after completing its forward movement, the spring 49 operating upon the bell crank 47 oscillates the bell crank, returning the crank 39 to its original position and causing the pawl 50 to engage the ratchet 45. This movement of the ratchet 45 is imparted through the sleeve 44 to the gear 43, rotating the same in the direction of the arrow in Fig. 4. As the gear 43 meshes with the gear 42, the latter will be rotated a complete revolution in the direction of the arrow in Fig. 4.

The primary drive shaft constantly rotates in the direction of the arrow in Fig. 6 a quarter of a cycle at each operation of the machine, while the secondary drive shaft rotates in a similar direction but completes a cycle at each calculation.

It will be seen from Figs. 1, 2 and 16, that the forward stroke of the handle must be completed before the pawl 50, which operates the sleeve 44, will be in position to engage the notch in the ratchet wheel 45, to rotate the ratchet wheel on the return stroke of the handle. If for any reason the operator fails to complete the forward movement of the handle and releases the handle before it reaches its extreme forward position, the ratchet wheel 45 will not be engaged by the pawl 50, and there will be no operation of the computing mechanism during the return movement of the handle. It will be necessary for the operator again to move the handle forwardly in order to engage the pawl 50 with its ratchet wheel, and there will be no operation of the mechanism on the return stroke, until the handle has been moved to its extreme forward position to complete the operation performed by the forward stroke of the handle. Because of this arrangement, there is no possibility of disturbing the proper sequence of operation of the computing mechanism by failure to move the handle through a full stroke. The fact that the two shafts 40 and 41 are operated entirely independently of one another, each remaining stationary during the movement of the other, and the fact that the shaft 41 cannot be operated until the movements controlled by the shaft 40 are completed, insures proper sequence of operation of the computing mechanism. Moreover, in case the shaft 40 is not moved a sufficient amount to complete the operations performed by the forward rotation of the handle because of an insufficient movement of the handle, this shaft will remain in the position to which it has been moved, until the operator again moves the handle to complete the forward stroke, because of the fact that on the return movement of the handle, the dog 51 slides over the ratchet wheel 46, and does not carry the ratchet wheel backwardly with it.

*Rack lock and release.*

Under normal conditions—that is to say, when the machine is inoperative—the racks are locked against forward reciprocation, but after any of the denominational keys have been set and movement is imparted to the crank 39, the first portion of said movement releases the racks and permits the same to move under the influence of the springs 32 until they contact with the keys set. This unlocking action of the slides also locks the lock bars 22 of the keys against movement, thereby preventing any key in the series from being depressed or operated during the forward and return movements of the crank 39.

Mounted on the shaft 25 adjacent to each terminal thereof is a bell crank 53, Figs. 2, 3, and 4, which bell cranks are connected at their forward terminals by the bar 54. This bar rests in the enlargements 29 of the slots 28 in slides 26 and bears against the projections 29ᵃ formed by said enlargements, thereby locking the slides and racks against movement. The rear end of the bell cranks 53 coöperates with cams 55 Figs. 1, 3, 4, and 18 mounted upon the primary drive shaft 40, each of said cams being provided with four projecting cam surfaces 55', which coöperate with the tails of the bell crank levers 53 successively. When the shaft 40 rotates a quarter of a turn in the forward direction, the cam surfaces 55' adjacent to the tails of the bell cranks 53 will oscillate said bell cranks about the shaft 25, hence lowering the bar 54 from its contact with the shoulders 29ª formed by the enlargements 29. This permits the slides 26 to move forwardly under the influence of the springs 32 and cause the bar 54 to ride upon the projection 29ª of the slot 28 in each slide. As soon as the cam surfaces 55' pass from engagement with the tails of the bell cranks 53 and the slides are returned to their normal positions, the bell cranks will be returned to their locking positions by the spring 53ª thereby moving the tails thereof into the paths of the next cam surfaces 55'.

Each bell crank 53 is provided with an upward extension 56 between the terminals of which is interposed a bar 57, which rests normally elevated above the lock bars 22 of the keys. When the bell cranks 53 are oscillated about the shaft 25, and the forward terminals thereof are lowered to release the slides and racks, this movement will cause the bar 57 to bear upon the lock bars 22 of the keys and prevent said lock bars from being oscillated, and hence any keys from being depressed during the operation of the machine. This bar 57 is held in this position by the action of the projections 29ª of the slides upon the bar 54, locking the forward terminals of the bell cranks 53 in their lowered positions. When the slides are returned and the forward terminals of the bell cranks are elevated, the bar 57 is likewise elevated, releasing the lock bars 22 of the keys and permitting the depression of any keys.

*Totalizer.*

The totalizer utilized in the present invention is what is known as a reversible totalizer, that is to say, it will operate and carry in both directions to add and subtract. This totalizer is constructed in units or sections, each unit comprising a numeral wheel, means for driving the numeral wheel from the racks, a truing mechanism for taking up the lost motion, a carrying wheel which is connected with the unit of the next adjacent higher decimal order, and a clearing wheel.

A shaft 58 Figs. 1 to 7 is mounted between the side walls of the casing 11 and constitutes the main shaft of the totalizer. The units of the totalizer for each decimal order are mounted upon this shaft in sufficiently spaced relation to accommodate the various coöperating mechanisms. Inasmuch as all of the units are of similar construction and arrangement, with the exception of the unit of the highest decimal order which has no one-toothed carrying gear, it will be only necessary to describe one of these units.

The numeral wheel 59 is loosely mounted upon the shaft 58 and is constructed somewhat after the manner of a drum, as is illustrated in Fig. 7. Mounted upon the shaft 58 and attached to the interior of the numeral wheel is a gear 60 (Figs. 7 and 9), which constitutes the means whereby the power or rotary motion is transmitted directly to the numeral wheel. Loosely mounted upon the shaft 58 and adjacent to the open face of the numeral wheel 59 is a gear 61, which is spaced slightly from the numeral wheel aforesaid. A stud shaft 62 pierces the gear 61 (Figs. 8 and 9) and carries a gear 63 on the terminal thereof adjacent to the numeral wheel which meshes with the idler gear 64 mounted on the same face of the gear 61. This idler 64 meshes with the gear 60 for rotating the numeral wheel 59 in either direction see Figs. 7 and 9. Upon the opposite terminal of the stud shaft 62 is a gear 65, which meshes with a gear 66 loosely mounted upon the shaft 58. This gear 66 in turn meshes with a gear 67 carried by a bracket 68 keyed to the shaft 58. This gear 67 is adapted to be swung into contact with either side of the rack 36 to receive motion therefrom as said rack is moved forwardly. The motion received by the gear 67 from the rack 36 will be transmitted to the gear 66, hence to the gear 65 and the gear 63, and to the numeral wheel 59 through the medium of the gears 64 and 60. This motion is varied by the movement of the racks, which is limited by the keys depressed. Located upon the shaft 58 adjacent to the closed face of the numeral wheel 59 is a star gear 69, by means of which the numeral wheel is trued to take up lost motion. Adjacent to the star gear 69 is a one-toothed carrying gear 70, the tooth thereof being located adjacent the 9 on the periphery of the numeral wheel, and is adapted to carry 1 to the numeral wheel of the higher decimal order as the numeral wheel passes from 9 to zero. Mounted on the shaft 58 next to the carrying wheel 70 is an automatic clearing wheel 71, provided with one tooth or projection which is located adjacent to the zero on each numeral wheel, the utility of which will be hereinafter more fully described. It is apparent that each unit comprises a gear 61 with its associated gears 63, 64, 65, 66 and 67, a numeral wheel 59, the star gear 69, a carrying gear 70, and an automatic clearing gear 71, all of which are loosely mounted upon the shaft 58, one unit of the totalizer being spaced from the adjacent unit by suitable collars. The gear 61 of each unit of the totalizer is loosely mounted for rotation upon the shaft 58, with the exception of the gear 61 of the units order, which is held against rotation by any suitable means. The gear 60, the numeral wheel 59, the star gear 69, the carrying gear 70 and the automatic clearing wheel 71 of each unit, operate as a single element, being secured one to the other.

Loosely mounted upon the drive shaft 40 directly under the carrying gear 70 is a Geneva escapement 72, connected by a sleeve 73 with a gear 74 Figs. 2 and 7. This Geneva escapement 72 is adapted to mesh at predetermined intervals with the tooth of the carrying gear 70 of the unit of one decimal order, while the gear 74 meshes with the gear 61 of the unit of the next higher decimal order.

As the 9 of one decimal order passes from the sight line to bring the zero of said order to the sight line, the tooth of the carrying gear 70 meshes with the Geneva escapement 72, rotating the same one step, which rotation is imparted through the sleeve 73 to the gear 74 and thence to the gear 61 of the next higher decimal order, which motion is accordingly transmitted through the gears 63, 64 and 60 to the numeral wheel of that order. The rotation of the gear 61 shifts the position of the stub shaft 62 and the idler 64, thus shifting the fulcrum point of the pinion 64 relative to the pinion 60, and so shifts the pinion 60 together with its numeral wheel 59 one point.

By this construction, it is possible to obtain a carrying mechanism which will operate irrespective of the direction of rotation of the elements of the totalizer, and which will also carry from one decimal order to the next decimal order simultaneously with the calculation.

In a totalizer of this character, quite frequently lost motion occurs in the numeral wheels which, if not corrected, would destroy the accuracy of the resultants. In order to obviate this lost motion and entirely eliminate the same, the star gear 69 of each unit of the totalizer is alined with a truing dog 75 Figs. 3, 5, and 7 loosely pivoted upon the primary drive shaft 40 and adapted to enter between the teeth of the star gear 69 and take up any lost motion which may occur in its respective unit, the tail of each dog coöperating with a cam 76 Fig. 17 mounted upon the secondary drive shaft 41. These cams are staggeredly arranged upon the secondary drive shaft 41, so that as the secondary drive shaft rotates upon the return movement of the crank 39, the units of the decimal or denominational orders will be trued successively; that is to say, the truing dog 75 of the units order will enter between the teeth of the star gear 69 and completely true the same prior to the entrance of the truing dog into the star gear of the tens decimal order, etc. From the arrangement of the gears coöperating with the numeral wheel, by means of which the motion is transmitted from the racks to the numeral wheel, the numeral wheel is operated in a direction which is the reverse of the direction of rotation of the gear 66.

*Setting mechanism.*

When the machine is inoperative, that is to say prior to any calculation, the gear 67 and its bracket 68 are so positioned that the gear does not mesh with either side of the rack 36, and hence if the racks are permitted to reciprocate no calculation will occur. In order to render the machine operative, it is necessary to set the mechanism so that when the shaft 40 begins its quarter cycle rotation forwardly, the gear 67 will be immediately and instantaneously thrown in mesh with one or the other side of the coöperating rack 36.

To accomplish this, the keyboard is provided with two keys 77 and 78 illustrated in detail in Fig. 6, mounted in a unit of said keyboard, similar in construction to the remaining units thereof. A shaft 80 passes directly under the keys 77 and 78, the stems of which are offset in opposite directions to permit the passage of the shaft therebetween. This shaft terminates at its rear terminal in the vertical plane of the shafts 40 and 58. The opposite sides of the shaft 80 adjacent each of the keys 77 and 78 are provided with the pins 81, which enter into a slot 82 in the offset portion of each key. When the key 78 is depressed, coöperation thereof with its pin 81 will cause the shaft 80 to be rotated in one direction, whereas if the key 77 is depressed the coöperation thereof with its pin 81 will cause the shaft to be oscillated in the opposite direction. A disk 83 Fig. 15 is mounted upon the forward terminal of the shaft 80 and is provided with three depressions, one central and one upon each side thereof. These depressions coöperate with a stationary spring-pressed pawl 84. By this means, the shaft is locked against accidental movement in its medial or either of its adjusted positions. At the inner terminal of the shaft 80 is a geared segment 85, which is keyed to said shaft and oscillates therewith. This geared segment 85 Figs. 6, 7 and 14 meshes with a rack upon a block 86 keyed for reciprocation upon the totalizer shaft 58, to which are also keyed the brackets 68 carrying the gears 67 as before described. On the opposite sides of this block 86 are a pair of pins 87 and 88 Figs. 1, 6, 7, and 14, which project from said block in the same horizontal plane but which are spaced one from the other as to the vertical planes thereof, as illustrated in Fig. 1. Mounted for vertical reciprocation upon the primary drive shaft 40 and the totalizer shaft 58 is a slide 89 Figs. 6 and 14, which is offset at its lower terminal for the accommodation of the cam 90 keyed to the primary drive shaft 40 and adapted to rotate therewith in the direction of the arrow in Fig. 6. Adjacent to the offset portion of the slide 89 is a tooth 91 which contacts with the periphery of the cam 90 for the vertical reciprocation of the slide at predetermined intervals by said cam. A bearing 87' is formed on one side of the slide 89, while a bearing 88' is formed on the opposite side of the slide 89, said bearings extending therefrom at right angles to the body of the slide and are provided with upwardly extending contact portions 87" and 88", respectively. These contact portions are adapted at predetermined intervals to contact with their respective pins 87, 88, and oscillate the totalizer shaft 58 when the slide 89 is reciprocated vertically.

A plate 92 Fig. 14 loosely mounted upon the primary drive shaft 40 is connected to the bearings 87' and 88' by a pair of springs 93, which draw the slide 89 downwardly and the tooth 91 thereof in constant contact with the cam 90.

Under normal conditions, when the shaft 80 is in its medial position and held in such position by the spring pawl 84, the pins 87 and 88 are so positioned with respect to the contacts 87" and 88" that said contacts wholly miss the pins aforesaid upon the upward reciprocation of the slide 89, thus permitting the racks to reciprocate without performing any calculation. In this manner it is possible to print without calculating. Should, however, the key 78 be depressed, the shaft 80 will be oscillated to the right, bringing the pin 87 into alinement with its coöperating contact 87". When the parts are in this position, a quarter cycle movement of the primary drive shaft 40 will immediately, through the medium of the cam 90, reciprocate the slide 89 upwardly to cause the contact 87" to bear against the pin 87 and oscillate the totalizer shaft 58, moving all of the brackets 68 upwardly and bringing the gears 67 carried thereby into contact with the upper sides of the racks 36. If, however, on the contrary the key 77 is depressed, the shaft 80 will be oscillated in the opposite direction, causing the contact 88" to be brought into alinement with its coöperating pin 88. When the primary drive shaft then takes its quarter cycle of rotation, the cam 90 forces the slide 89 upwardly, causing the contact 88" to bear upon the pin 88, oscillating the totalizer shaft 58 forwardly and moving all of the brackets 68 keyed thereto downwardly, and the gears 67 carried thereby into mesh with the lower side of the racks 36.

It is therefore apparent that when the machine is passive, the number-bearing members or numeral wheels 59 of the totalizer are wholly disconnected from the racks 36, due to the neutral positions of the gears 67; and when the motion is imparted to the primary drive shaft 40, the initial movement thereof will under normal conditions set the totalizer, by meshing the gears 67 with one side or the other of the racks 36. The direction of rotation of the totalizer, and consequently the nature of the calculation performed thereon, is hence determined by the keys 77 and 78.

The formation of the cam 90 which controls the reciprocation of the slide 89 is such that the shaft 58 is set by the reciprocation of the slide only during the quarter cycle of rotation of the primary drive shaft 40. At the end of this quarter cycle of rotation, the tooth 91, Figs. 6 and 14, enters one of the notches formed in the cam 90, thereby permitting the springs 93 to act upon the slide 89, returning the totalizer shaft 58 and the gears 67 controlled thereby to their neutral positions. This permits the slides 26 to be returned to their normal positions against the influence of the springs 32 without affecting the totalizer. Thus the calculation is only performed upon the quarter cycle movement of the primary drive shaft 40.

After the quarter cycle movement of the primary drive shaft 40, it is necessary to return the shaft 58 and the gears 67 to their neutral positions, which is accomplished by an arm 94, Fig. 6, provided with the notch 95 in its terminal and keyed to the totalizer shaft 58 adjacent to the slide 89. The straight sloping sides of the notch 95, coöperate with a pin 96 formed at the upper terminal of the slide 89. An arm 97 is loosely mounted on the primary drive shaft 40 and is connected by means of a coil spring 98 to an arm 99 keyed to the totalizer shaft 58 Fig. 7. As the movement of the slide 89 rocks the totalizer shaft 58 in one or the other of its directions, the pin 96 rides upwardly on one or the other of the inclined sides of the notch 95, and when the tooth 91 of the slide 89 enters one of the depressions or notches of the cam 90 under the influence of the springs 93, the action of these springs upon the slide causes the pin 96 to ride downwardly upon one or the other of the straight sides of the slot 95, thus returning the totalizer shaft to its neutral position. The spring 98 acting between the arms 97 and 99 tends to hold the shaft 58 and the gears 67 normally in their neutral positions, irrespective of the action of the slide 89. It is thus apparent that the springs 98 and 93 act upon the shaft 58 to normally hold the same in its neutral position, and to under normal conditions retain the totalizer inactive.

When it is desired to use the machine for printing and perform no calculations, it is necessary to shift the totalizer control shaft 80 into its neutral position, so that the contacts 87" and 88" will pass the pins 87, 88 upon the reciprocation of the slide 89, without bearing thereagainst, thus retaining the shaft 58 in its neutral position under the influence of the spring 98. This is accomplished by the "non-calculate" key 100 mounted in the same unit of the keyboard as the keys 77 and 78, which is bifurcated (Fig. 20) as at 101 to form the arms 101$^a$ and 101$^b$, which are located upon opposite sides of the shaft 80, and each of which is provided with a slot 102. The shaft 80 is provided with a normally horizontal transverse pin 103, which is engaged by the slots 102 aforesaid, said pin extending on each side of the shaft for simultaneous engagement with both of the slots 102. The key 100 is provided with an elevating spring 104. When this key 100 is depressed, irrespective of the adjusted position of the shaft 80, the terminal of one or the other of the slots 102 will contact with the coöperating terminal of the pin 103 and rotate the shaft until both ends of the pin 103 contact with both terminals of the slots 102 and the plunger 84 enters the medial notch of the disk 83. The pin 103 assumes a horizontal position, and the shaft 80 is in such a position that the reciprocation of the slide 89 does not affect the totalizer shaft 58. The spring 98 acting upon the shaft 58 retains said shaft in its neutral position and hence, when the machine is operated and the slides 26 reciprocated, the number set upon the keyboard will be printed and not registered upon the totalizer.

*Totalizer lock.*

When the shaft 58 is rocked by the action of the slide 89, the arm or brackets 68 carrying the gears 67 raise and lower the gears according to the direction of rotation of the shaft 58, causing the gears 67 to ride around their meshing gears 66. This riding of the gears 67 about their meshing gears 66 tends to rotate the gears 66 and move the totalizer wheels, thereby destroying the accuracy of the machine. It is therefore desirable to lock the totalizer elements or units during the setting of the gears 67 and prior to the release of the slides and racks 26 and 36, respectively.

A totalizer lock shaft 105 Figs. 3 and 4 is provided adjacent to the primary drive shaft 40, and the totalizer shaft 58, and at intervals throughout its entire length has keyed thereto the locking arms 106, which are offset at their terminals for engagement with the gears 66. One of these arms is provided for each totalizer unit and is so located that it extends between the number-bearing member of one unit and the rack of the next adjacent unit, and engages the gear 66 through the medium of its offset terminal. One end of the lock shaft 105 is provided with an arm 107, which is acted upon by a spring 108 Fig. 4, the action of said spring upon the arm being such that the shaft 105 is oscillated to bring the offset terminals of the arms 106 into engagement with the teeth of the gears 66, thereby locking said gears from movement. This arm 107 coöperates with the cam 109 Figs. 4 and 19 keyed to the primary drive shaft 40, at one terminal thereof (Figs. 3 and 4), which cam is provided with four cam surfaces 110, each of which corresponds to one-eighth of a revolution of the primary drive shaft 40. When movement is imparted to the primary drive shaft 40 to rotate the same a quarter of a revolution forwardly, the arm 107 rides upon the body of the cam 109, as illustrated in Fig. 4, thereby permitting the arms 106 to lock the gears 66 from movement; and it is during this initial period of movement on the part of the primary drive shaft that the totalizer shaft 58 is rocked and the gears 67 set to mesh with one side or the other of the racks 36. Therefore, during an eighth of a revolution of the primary drive shaft 40, or one-half of its complete movement during a single operation of the machine, the totalizer remains stationary and is set for either addition or subtraction.

By reference to Fig. 4, it will be apparent that the correlation between the cam 55 and the cam 109 is such that while the arm 107 operates against the body of the cam 109, to-wit, between two of the cam surfaces 110, the tails of the bell cranks 53 do not contact with the cam surfaces 55' of the cams 55; but when the arm 107 rides upon one of the cam surfaces 110 of the cam 109, one of the cam surfaces 55' of each of the cams 55 contacts with the tails of the bell cranks 53 to release the slides 26. Therefore, the first eighth of a revolution of the primary drive shaft 40, or one-half of its complete movement during any one calculation, is devoted to setting the totalizer for either addition or subtraction, and said totalizer and its coöperating slides and racks 26 and 36, respectively, are locked from rotation; and the second eighth of its revolution, to-wit, the second half of its complete movement during a single calculation is devoted to releasing the slides and racks 26 and 36, respectively, and unlocking the totalizer to permit said totalizer to receive the numbers set up on the keyboard.

*Printing mechanism.*

The printing mechanism utilized in the present machine is set and adjusted directly by the movement of the slides 26 and is operated to record the numbers set up on the machine upon the return movement of the handle or crank 39; that is to say, as the slides 26 operate forwardly to perform the calculation upon the totalizer, this movement adjusts the printing segments to bring the proper type faces into alinement, and when the handle is released for its return movement the printing operation takes place just prior to the return of all of the movable elements to their normal and inactive positions.

As heretofore described, the extensions 37 of the slides 26 are arranged compactly at the center and rear of the machine and are provided with the bifurcated uprights 38, to which the printing segments Figs. 1, 2, and 3 are connected. A casing 111 surrounds the extensions 37 of the slides 26 and is designed to inclose the printing mechanism and constitute a bearing for the shaft 112. A transverse bar 113 is interposed between the walls of the casing 111 adjacent to the top thereof and is provided with the dependent segmental guides 114 Figs. 3 and 12, which guides are spaced one from the other. Each type guide is shouldered to form an extension 115. A type segment 116 Figs. 3, 12, and 13 is mounted for reciprocation in the shoulder portion of each guide 114 and against the extension 115 thereof, said segment being provided at its lower terminal with an arm 117 Fig. 3 which is journaled on the shaft 112. At the joint between each type segment 116 and its arm 117 is a stud 118, which is received in the bifurcation of the bifurcated upright 38 of the adjacent extension 37. As the slides 26 are released, the extensions 37 thereof will move therewith and swing the arms 117 and the type segments 116 about the shaft 112, which movement is proportionate to the movement of the slide 26 and is regulated by the denominational key depressed. As illustrated in Fig. 12, the segment 116 is provided with the outstanding ribs 119. The type faces 120 are provided with the necks or extensions 121, which at their terminals are offset to form the shoulders 122. The extensions 121 of the type faces rest between the ribs 119 of the segments 116 and bear against the face or the body of the guides 114. The type of each order are held in position by the next adjacent guide 114, with the exception of the type provided for the units denominational order, which are held in place by a curved plate 123 (Figs. 12 and 13). Opposite the printing line, each guide 114 is provided with a slot 124, in which the hammers operate and engage the noses or shoulders 122 of the type, as will be hereinafter more fully described.

It will therefore be apparent that as the slides 26 are released and moved forwardly, the corresponding segments 116 are adjusted, bringing the proper type to correspond with the key depressed into the plane of the printing line and also into alinement with the coöperating hammer slots 124 of the guides 114. When the hammer is released and operates against the type so set, the type is brought forward against the ribbon and the platen to record the digit. This provision of independently movable type eliminates all load from the hammers and decreases the jar against the platen.

It will be noted, from Figs. 2 and 3, that normally the type is located above the hammer slots 124 and that the zero type are constantly in the plane of the printing line, and hence if all the hammers are released within the movement on the part of the segments 116, a series of zeros would be recorded.

Extending transversely of the casing 111 is a pair of shafts or supports 125, Figs. 2 and 3, upon which are mounted the hammers 126, for reciprocation. Each hammer is operated upon by a spring 127, which under normal conditions is placed under a tension which tends to throw the hammer toward the platen. At the forward terminal of each hammer is a hook 128, (Fig. 13), which projects into the hammer slot 124 of the alined type guide 114. As the coöperating segment is swung downwardly by the action of its slide 26, the shoulders or noses 122 upon the type of that segment will be drawn through the hammer hook 128 and said hook will engage one of said noses of the type at any of the adjusted positions of the segment 116 (Fig. 13). Under normal conditions, the hammer hooks 128 each engage the coöperating zero type, and hence if there is no adjustment of the machine all hammers operated will print zeros. There is one hammer provided for each printing unit, which consists of a series of type 120, a guide 114 and a segment 116.

Each hammer is provided at its rear terminal with a primary lock shoulder 129, and medial of its length with a secondary lock shoulder 130, which is in the form of a tooth having one side thereof beveled or sloped, Figs. 2 and 3. A hammer lock shaft 131 is mounted under the hammers 126 adjacent to the primary lock shoulders 129 and is interposed between the walls of the casing. The bell crank 132 is mounted upon one terminal of this hammer lock shaft 131 and has the tail 133 thereof contacting with the cam 134 mounted upon the secondary drive shaft 41. As this bell crank 132 is keyed to the hammer lock shaft 131, the oscillation thereof by the cam 134 upon the operation of the secondary drive shaft 41 will oscillate the hammer lock shaft 131. The opposite arm of the bell crank 132 is bent at right angles to the body thereof and extends in front of all of the primary lock shoulders 129 and holds the hammers against the action of their coöperating springs 127. Loosely mounted upon the hammer lock shaft 131 are a plurality of bell cranks 135. (Fig. 21.) Each bell crank has one arm 136 thereof located vertically and the opposite arm 137 thereof horizontally, the arm 137 being provided with a tooth 138 at its terminal which engages the secondary lock shoulder 130 of the adjacent hammer. One side of the vertical arm 136 of the bell crank is provided with an outwardly projecting pin 139, while a lip 140 extends from the other side of the said arm in the same horizontal plane as the pin 139. Each bell crank is acted upon by a spring 141 to hold the tooth 138 thereof in engagement with the coöperating secondary lock shoulder 130 of the coöperating hammer. Therefore the pin of one bell crank 135 operates against the lip 140 of the next adjacent bell crank of a lower denominational order. Each extension 37 of the slides 26 is provided with a shoulder 37$^a$, which is alined with the extremity of the arm 136 of the coöperating bell crank of that order.

As the slides 26 move forwardly, the extensions 37 thereof move with them, setting the corresponding segments 116 of the printing mechanism to bring the proper type into the plane of the printing line to correspond to the key depressed. This movement of the slides causes the shoulders 37$^a$ of the extensions 37 of the operating slides to contact with the alined vertical arms 136 of the bell cranks 135 and move said bell cranks against the tension of the springs 125. As the slides remain in their forward position during the quarter turn of the primary drive shaft 40 and during part of the complete revolution of the secondary drive shaft 41, the bell cranks 135 would be held in this position, releasing certain of the hammers. Upon the return movement of the crank 39, the secondary drive shaft 41 takes a complete revolution, and, as the printing mechanism must be instantly operated and returned to its initial position prior to any movement of the slides, the tail 133 of the bell crank 132 immediately operates against the cam surface of the cam 134, Fig. 3, which causes the opposite arm of said bell crank arm 132 to release all of the hammers. Thus each hammer released by the bell cranks 135 will be reciprocated under the influence of its spring 127 to drive the type set to coöperate with the hook 126 thereof against the ribbon, to record a digit. The hammers which are not released by the bell cranks 135, which depends entirely upon the slides operated, are held in their retracted position against the influence of the springs 127, by said bell cranks. The cam surface of the cam 134 is of such a length that as soon as a record has been made by the type, the tail 133 of the bell crank 132 rides upon the body of the cam, thereby oscillating said bell crank to return all of the hammers released to their normal and inactive positions, as illustrated in Fig 3.

It is desirable and is the practice, in machines of this type, to print zeros to the right of the digit of the lowest order recorded, and to accomplish this the pins 139 and lips 140 are provided. If the bell crank 135 of the hundreds denominational order is operated by its coöperating slide 26 and the slides of the tens and units denominational orders are not operated to present a different type from the zero type to the coöperating hammers, the pin 139 of the bell crank of the hundreds denominational order will engage the lip 140 of the bell crank of the tens denominational order, and the pin 139 of the bell crank of the tens denominational order will contact with the lip 140 of the units denominational order and oscillate the bell cranks 135 about the hammer lock shaft 131 to release the hammers of both the tens and the units denominational orders. Hence, when the bell crank 132 is oscillated about the hammer lock shaft 131, these hammers of the tens and units orders will be influenced by their coöperating springs 127 to drive the zero type toward the platen, thereby recording zeros, without any adjustment of the segments 116 whatsoever.

When the slides 26 are returned to their normal and inactive positions, as will be hereinafter described, the extensions 37 thereof will move rearwardly of the machine, swinging all adjusted segments 116 back to their initial positions, and permit the bell cranks 135 which have been adjusted to be influenced by the springs 141 to return to their initial positions to engage the secondary lock shoulders 130. Prior to this, however, the printing operation has been completed and all of the hammers 126, which have been released, have been returned to their original positions by the cam 134 operating against the tail 133 of the bell crank 132.

In order to print the characteristic of each item recorded, that is to say, whether it was added or subtracted, a pair of keys 142, 143 are provided adjacent to the keys 77 and 78, which control the calculations performed by the totalizer. These keys 142, 143 coöperate with a slide 144, which is provided with an extension 145 but has no rack 36. This extension 145 of the slide 144 coöperates with a printing segment adjacent to the printing segment of the highest denominational order, which is provided with only two type, one having a "D", meaning debit, and one having a "C", meaning credit, or similar symbols such as plus and minus signs. The characteristic printing segment is provided with all of the elements of the other segments, and as one of the keys 142, 143 constantly remains in a depressed position, in accordance with the setting of the totalizer, the dog 135 coöperating with the hammer 126 of this segment will always be released when the machine is operated to release the slides. It will be seen that when one of the keys 77, 78 is depressed, the adjacent key 142 or 143, respectively, is likewise depressed, and while said keys are depressed the same characteristic will be printed before each item recorded.

*Rack return.*

After the slides 26 are moved forwardly, performing a calculation upon the totalizer and setting the printing mechanism, and after the printing mechanism has been operated, it is necessary to return the slides to their original positions, which also resets the printing mechanism. This is accomplished after the movement of the primary drive shaft 40 has been completed, and hence after the gears 67 are out of mesh with the racks 36 and just after the tail 133 of the bell crank 132 has been disengaged from the cam surface of the cam 134.

Mounted for reciprocation upon the primary and secondary drive shafts 40 and 41, respectively, and adjacent to each terminal thereof, is a return slide 146 Figs. 3, 4, 7, and 10, which return slides are connected at their forward terminals by the return bar 147. These slides 146, in combination with the return bar 147, constitute a frame which reciprocates horizontally for the return of the slides 26 and is retained at the forward end of its path of movement by a spring 148 attached to the bar 147 of one terminal and to the shaft 24 at the other end. Each return slide 146 is provided adjacent to its rear terminal with the rack 149, which is arranged to mesh with a mutilated gear 150 mounted on the adjacent terminal of the secondary drive shaft 41.

As the slides 26 are released, the vertical extensions 34 thereof will be moved toward the return bar 147, the position of the vertical extension of each slide with respect to said return bar being dependent entirely upon the denominational key depressed. When the crank 39 is released to be returned to its initial position under the influence of spring 49, the movement thus imparted to the secondary drive shaft 41 will cause the mutilated gears 150 to rotate. This rotation brings the teeth of the gears 150 into engagement with the racks 149, thereby reciprocating the return slides 146 and the return bar 147. As the return bar is thus reciprocated, it engages the vertical extensions 34 of such slides as have been operated and resets them to permit the engagement of the lock bar 54 (Fig. 4) by the shoulders 29ª of the slides. At the end of this movement of the return slides 146, the racks 149 thereof are released by the teeth of the gears 150, as illustrated in Fig. 10, and the entire structure, including the return slides 146 and the return bar 147, is reciprocated in the opposite direction under the influence of the spring 148. The mutilated gears 150 normally bear the relation to the racks 149 illustrated in Fig. 10, and it will therefore be manifest that these gears will rotate freely prior to the engagement of the racks 149 thereby, and that at the end of the reciprocation of the slides 146 and the bar 147 the gears assume the position shown in Fig. 10. Thus, the secondary drive shaft 41 is free to rotate to operate the printing mechanism prior to the return of any of the slides 26.

*Automatic clear.*

This machine is provided with an automatic clearing mechanism which upon the depression of a key sets the totalizer to operate in a reverse direction to that in which it was last operated (if last operated addingly), and sets a plurality of dogs to coöperate with the clearing wheels of the totalizer. If the machine is operating addingly, it is necessary to set the totalizer to operate subtractingly to clear the same, whereas if it is operating subtractingly no change is necessary.

An automatic clearing shaft 151, Figs. 1 and 2, is provided adjacent to the totalizer shaft 58, and is slightly elevated above the same. This automatic clearing shaft 151 carries a plurality of clearing dogs 152, one dog being provided for each clearing wheel 71, and is alined in the same vertical plane therewith. It will be noted, by reference to Figs. 2, 3, 4 and 5, that the automatic clearing shaft 151 acts as a guide for the horizontal extensions 35 of the slides. Under normal conditions the dogs 152 are elevated, as in Fig. 2, so that their terminals are out of the paths of movement of the teeth of the clearing wheels 71. However, when the automatic clearing mechanism is set, the shaft 151 will be rocked, swinging the terminals of the dogs 152 into the paths of movement of the teeth of the clearing gears 71. In order to accomplish this, one terminal of the shaft 151 is provided with an arm 153, Fig. 6, which is pivotally connected to a slide 154, which reciprocates upon one side of the casing of the machine and is offset to have its terminal to be alined with the shaft 80 (Fig. 7). An automatic clearing key 155 is provided in the same keyboard unit as the totalizer controlling keys 77 and 78, the stem of which is offset and slotted, as at 156, to embrace the same side of the shaft 80 as the key 78. The key stem is also provided with the cam surface 157, which operates against the terminal of the slide 154 to oscillate the same, said cam surface 157 providing a shoulder 158 (Fig. 6), whereby the key 155 is locked in its depressed position if desired. In order to normally retain the "automatic clear" key 155 in its elevated position, a retractile spring 159 is provided, one terminal of which is secured to the key stem and the other terminal of which is secured to a stationary part of the machine. A pin 160 extends transversely from the shaft 80 and operates in the slot of said portion 156 of the key stem 155. When it is desired to clear automatically, every slide must be released. It is therefore necessary to oscillate the lock bars 22 of the keyboard to move the locks 23 thereof from the paths of movement of the slides 26. This is accomplished by the cam surface 155ª of the key 155, which operates against a pin 162ᵇ formed on the release bar 162 and engages all of the key lock bars 22, as will hereinafter be more fully described.

When the key 155 is depressed, the cam portion 157 thereof will operate against the slide 154 to move the same toward the rear of the machine, which movement swings the arm 153 to rock the shaft 151, bringing the terminals of the dogs 152 into the paths of movement of the teeth of the clearing wheels 71. When the crank 39 is operated forwardly, all of the slides will be simultaneously released by cam surface 155ª and release bar 162 after the totalizer has been set, and will reciprocate forwardly, which movement is imparted to the totalizer wheels by the tracks 36 in the usual manner. Inasmuch as none of the denominational keys of the keyboard have been depressed, they will not act as stops for the slides and the totalizer wheels will rotate until the teeth of the carrying wheels 71 contact with the terminals of the dogs 152. When this occurs, the movement of the slides is arrested and the totalizer wheels locked from movement. The clearing tooth of each clearing wheel 71 being opposite the zero of each numeral wheel, the digit exhibited at the sight line will be zero, and consequently the machine will be clear. It is therefore manifest that the dogs 152 act as substitutes for the keys in arresting or stopping the movement of the slides and the numeral wheels. The slide 154 is returned to its normal position after the release of the key 155 by the spring 161, which operates on the free terminal of the slide, as illustrated in Fig. 6.

The direction of rotation of the totalizer is controlled by the pin and slot connection between the key 155 and the shaft 80. Assuming that the key 77 is depressed for setting the totalizer for adding, the shaft 80 will be rocked to bring the pin 160 adjacent to the upper terminal of the slot formed in the offset portion 156 of the key 155. Thus, when the automatic clearing key is depressed, the terminal of the slot will immediately contact with the pin 160, rotating the shaft 80 to set the totalizer to operate in the reverse direction, or subtractingly; whereas, on the contrary, if the key 78 is depressed for the totalizer to operate subtractingly, the depressing of the key 155 does not affect the shaft 80.

*Denominational key release.*

Irrespective of the positions of the slides 26, the depressed key 15 of each denominational series is locked in such position by the lock bar 22, and consequently in order to return the keys to their initial positions it is necessary to release said keys from engagement with said lock bars 22. A key release bar 162 extends transversely of the machine over the lock bars 22 and is provided with a plurality of notches 163, one of which engages each lock bar 22. The reciprocation of this bar 162 oscillates the lock bars 22 and disengages them from the key locks 20, thereby permitting the retractile springs 19 to operate upon the keys to elevate the same. The bar 162 is returned to its normal position by a spring 162ª (Fig. 3) to hold the lock bars 22 in their normal positions.

The release of the keys must be accomplished after the calculation and recording, and therefore the release bar 162 is reciprocated after the completion of the movement of the primary drive shaft 40 and during the last portion of the movement of the secondary drive shaft 41. A key release shaft 164 is mounted longitudinally of the machine and extends under the release bar 162, and carries at its rear terminal an eccentric projection 165, which extends transversely from the shaft and coöperates with the pins 166 formed upon the gear 43 on the primary drive shaft. This gear rotates a quarter of a revolution, imparting a complete revolution to the secondary drive shaft 41, and consequently to rock the shaft 164 at the termination of each calculation four pins 166 are provided, one for each quarter of a revolution of the gear 43. Referring to Fig. 4, it will be seen that during the inactivity of the machine one of the pins 166 rests adjacent and above the eccentric projection 165 formed on the release shaft 164. When the gear 43 rotates in the direction of the arrow in this figure, its movement is nearly completed when the next pin 166 passes the projection 165 upon the release shaft 164 and rocks said shaft. The release shaft 164 is provided with a pin 167 which operates against a roller bearing 168 formed on the end of the release rod 162. When the shaft 164 is rocked by the gear 43, the pin 167 operates against the roller bearing 168 and reciprocates the release bar 162 to elevate all of the lock bars 22, which releases all depressed denominational keys and permits the elevation thereof. The shaft 164 is rocked in the reverse direction after being operated upon by one of the pins 166 to bring the projection 165 into the path of the next adjacent pin by a centering spring 169 operating upon the arm 170 keyed to the forward end of the shaft. This spring holds the shaft, under normal conditions, so that the eccentric projection 165 thereof rests in a normally horizontal plane.

*Repeat key.*

The locking of the keys in their depressed positions and the release thereof is wholly independent of the slides 26, and consequently the movement of the slides does not affect the keys. Therefore, in order to repeat a given calculation a number of times without resetting the denominational keys for each action, the shaft 164 must be so set that it will not be rocked by the gear 43 to reciprocate the release bar 162. To accomplish this, a repeat key 171 is provided, which is slotted as at 172 to coöperate with the pin 173 extending transversely from the shaft 164. This pin extends into the slot 172 medial of the length thereof, so that the shaft 164 can oscillate under normal conditions without affecting the key or being limited in its movement by the key. The repeat key 171 is also provided with a shoulder 174 which locks under the plate 14 of the keyboard carrying the same to retain the key in its depressed position, and is also provided with a retractile spring 175, which normally tends to elevate the key when the said shoulder is released from engagement with the plate 14.

When the key 171 is depressed until the shoulder 174 thereof is locked under the plate 14 of the keyboard in which the key 171 reciprocates, the upper terminal of the slot 172 thereof operates against the pin 173 to oscillate the release shaft 164 against the action of the spring 169, thereby swinging the horizontal eccentric projection 165 out of the path of movement of the pins 166. This movement of the key also swings the pin 167 of said shaft away from the roller bearing 168 of the release bar 162, so that the movement of the shaft under the influence of the key 171 does not affect said release bar. When the key is depressed and locked in this position, the gear 43 will operate upon the return movement of the handle 39 without affecting the release shaft 164, and consequently as said shaft is stationary the release bar 162 is not reciprocated and the denominational keys 15 remain in their depressed and adjusted positions.

*Error key.*

If a number of denominational keys be depressed and it is desired to release the same and return them to their initial positions without operating the machine, it is necessary to reciprocate the key release bar 162 independently of the gear 43 and the shaft 164, as the latter are only affected by the operation of the machine. To accomplish this, a key 176 is provided in the same unit of the keyboard as the repeat key 171 and is operated upon by the retractile spring 177 to retain the same in its elevated position. This key 176 has a cam surface 178 which operates against the pin 179 upon the opposite side of the release bar 162 to the roller bearing 168. When the key 176 is depressed, this cam surface rides against the pin 179 to reciprocate the release bar 162, thereby elevating the key lock bars 22 to release the keys and permit the same to return to their normal and inactive positions under the influence of the springs 19. The action of the cam surface against the release bar 162 is such that said bar is moved away from the pin 167, and consequently the movement of the error key and the release bar, when operated thereby, is wholly independent of the release shaft 164 and its associated elements. After the depression of the error key 176, the same is returned to its initial position by the spring 177, and the cam surface 178 thereof disengages the pin 179, permitting the slide and lock bars 22 to return to their normal and inactive positions under the influence of the spring 162$^a$ (Fig. 3).

*Ribbon feed and reverse.*

Mounted upon each side of the casing 111, which incloses the printing mechanism, is a bracket 180, each bracket having a spindle 181 journaled therein, to the lower terminal of which is keyed a bevel gear 182. Each spindle 181 has a ribbon spool 183 keyed thereto by means of which the ribbon is carried and fed across the printing line of the platen.

Mounted directly under the spindles 181 extending through the casing 111 is a ribbon feed shaft 184, which is arranged to reciprocate through said casing and through a ratchet wheel 185 keyed thereto. Each terminal of the shaft is provided with a handle 186 whereby the shaft is reciprocated longitudinally in the casing, and it is retained in its adjusted positions by a spring plunger 187 coöperating with the notches 188 in the shaft. Rigidly keyed to the shafts 184 are two bevel gears 189, one bevel gear for each of the bevel gears 182 secured to the spindles 181. These bevel gears 189 are so arranged upon the shaft 184 that when one is in mesh with its coöperating and adjacent bevel gear 182, the opposite gear is out of mesh with its coöperating and adjacent bevel gear 182, the meshing of said gears being determined by the position of the shaft 184. A rotary movement imparted by the ratchet wheel 185 to the shaft 184 will manifestly rotate one or the other of the spindles 181 and feed the ribbon from one spool to the other spool 183 thus mechanically rotated. This is accomplished by a slide 190 mounted for reciprocation on one side of the casing 111 adjacent to the ratchet wheel 185, said slide being acted upon by a coil spring 191 to normally draw the same toward the front of the machine. The secondary drive shaft 41 is provided with the crank arm 192, which, as the shaft rotates in the direction of the arrow in Fig. 5, will contact with the end of the slide 190 and force the same rearwardly of the machine against the tension of the spring 191. This slide is provided with a spring-pressed pawl 193 which coöperates with the teeth of the ratchet wheel 185 and as the slide reciprocates imparts a step-by-step rotation to the ratchet wheel 185, and hence to the shaft 184 and to the connected spindle 181. It is therefore apparent that at each operation of the machine the ribbon is fed from one spool to the other, and that the reverse of the feed thereof is accomplished by shifting the shaft 184 manually in one direction or the other.

Carriage and tabulator.

The carriage 12 reciprocates across the rear end of the machine on the tracks 194 through the instrumentality of rollers 195. This carriage carries a platen of any suitable and desired construction, 196, which is provided at its terminal with a ratchet wheel 197. A bar 198 extends across the rear of the carriage adjacent to the base thereof and is provided on its under surface with a plurality of notches 199 which are spaced one from the other a sufficient distance to escape the carriage to space the vertical columns of figures within the capacity of the machine. This escapement bar 198 coöperates with a spring-actuated escapement dog 200, whereby the carriage is locked in any of its adjusted positions.

The carriage may be escaped in any suitable manner, manually or by a spring drum of any suitable or desired construction, the entire escapement overcoming the action of the dog 200 to permit the carriage to escape one space or column.

Paper feed.

A paper feed shaft 201 extends from one side of the carriage to the other in a vertical plane with the platen 196, and has a yoke 202 pivoted thereon. This yoke coöperates with the rear terminal of slide 190, irrespective of the position of the carriage 12, so that at each reciprocation of the slide 190, which is at each calculation, the yoke 202 is oscillated. This yoke carries at one terminal thereof the spring-actuated pawl 203, which meshes with the teeth of the ratchet wheel 197 secured to the shaft of the platen 196. The terminal of this pawl 203 is beveled and operates against the pin 204, so that as the yoke oscillates it will enter between the teeth of the ratchet wheel 197 and rotate the platen to feed the paper up one step.

It is manifest, therefore, that for each calculation of the machine, or rather, each rotation of the secondary drive shaft 41, the ribbon will not only be fed across the printing line of the platen but said platen will also be fed step by step automatically from said secondary drive shaft.

The operation of the machine has been very fully described and it is therefore unnecessary to make a detailed or extensive explanation thereof. The depression of one of the denominational series of keys 15, the depression of one or the other of the keys 77, 78, to determine the calculation to be performed, and the operation of the crank 39, is all that is necessary to operate the machine. The forward movement of the crank 39 operates the primary drive shaft 40 a quarter of a revolution. During this forward rotation of the primary drive shaft 40, first, the shaft 58 is rocked to swing the gears 67 into mesh with one side or the other of the racks 36, in accordance with the key 77, 78 depressed; second, the cam 109 rocks the shaft 105 to disengage the lock arms 106 from the gears 66 of the totalizer to release said totalizer; and third, the bell cranks 53 are rocked to release the slides 26 and said slides operate forwardly under the tension of the springs 32, which performs the calculation and sets the printing mechanism. When the crank is released and takes its return movement under the influence of the spring 49, the secondary drive shaft 41 takes a complete revolution, which first releases the hammers 126 of the printing mechanism to record the items, and immediately returns the same to their initial positions; second, successively trues the numeral wheels of the totalizer to take up lost motion; third, returns the slides to their initial positions; fourth, operates the ribbon and paper feeds, and fifth, releases the depressed denominational keys 15.

What is claimed is:—

1. The combination with a totalizer, of an operating mechanism therefor, a printing mechanism adapted to be set by the operating mechanism aforesaid, said printing mechanism and said operating mechanism being normally inactive, a driving device for releasing said operating mechanism to calculate and to set the printing mechanism, and a second driving device independent of said first driving device for the operation of said printing mechanism at the termination of the calculation.

2. The combination with a totalizer, of printing mechanism, slides for operating said totalizer and for setting said printing mechanism, said slides and printing mechanism being normally inactive, a driving device for releasing said slides, and a second driving device independent of said first driving device for releasing said printing mechanism.

3. The combination with a totalizer, of printing mechanism, slides for operating said totalizer and for setting said printing mechanism, said slides and printing mechanism being normally inactive, a driving device for releasing said slides, and a second driving device independent of said first driving device for releasing said printing mechanism at a different period from the release of said slides during the operation of the machine.

4. The combination with a totalizer, of printing mechanism, slides for operating said totalizer adapted to set said printing mechanism, said slides and said printing mechanism being normally locked from operation, a driving device for releasing said slides to perform a calculation, and a second driving device independent of said first driving device for releasing said printing mechanism at the termination of the calculation aforesaid and after the releasing means for the slides has come to rest.

5. The combination with a totalizer, of a printing mechanism, slides for operating said totalizer and setting said printing mechanism, said slides and printing mechanism being locked from operation, a primary drive shaft, means operable by said drive shaft for releasing said slides, and means independent of said primary drive shaft for releasing said printing mechanism for operation.

6. The combination with a totalizer, of a printing mechanism, slides for operating said totalizer and simultaneously setting said printing mechanism, both the racks and the printing mechanism being normally locked from operation, a drive shaft, means operable from said primary drive shaft for releasing said racks, and means for releasing said printing mechanism for operation subsequent to the completion of the movement of the primary drive shaft.

7. The combination with a totalizer, of a printing mechanism, a plurality of slides adapted to operate said totalizer and simultaneously set said printing mechanism, said slides and printing mechanism being normally locked from operation, a drive shaft, means operable from said drive shaft for releasing said slides and setting said printing mechanism, hammers coöperating with said printing mechanism, and means operable at the termination of the movement of said drive shaft for releasing said hammers and operating said printing mechanism.

8. The combination with a totalizer, of a printing mechanism, slides arranged to operate said totalizer and set said printing mechanism, said slides being normally locked from operation, hammers for said printing mechanism likewise normally locked from operation irrespective of the movement of said slides, a driving device for releasing the slides to perform a calculation, and a second driving device independent of said first driving device for releasing the hammers of the printing mechanism after the releasing means for the slides has come to rest.

9. The combination with a totalizer, of slides for the operation of said totalizer normally locked from movement, printing mechanism adapted to be set by the movement of said slides, hammers for said printing mechanism, individual locks for said hammers, said locks arranged to be individually released by the slides aforesaid, a universal lock for all of said hammers, a driving device for releasing said slides to perform a calculation, and a second driving device independent of said first driving device for operating the universal lock aforesaid after the slide releasing means has come to rest.

10. The combination with a totalizer, of a printing mechanism, hammers for the operation of said printing mechanism, individual locks for said hammers, a universal lock for said hammers, slides for the operation of the totalizer arranged to set the printing mechanism and release the individual locks aforesaid thereby setting the printing mechanism, a drive shaft, means operable from said drive shaft for the release of said slides, and means independent of said drive shaft for releasing said universal lock of said printing mechanism for the operation thereof as set by the slides aforesaid.

11. The combination with a totalizer, of printing mechanism embodying a plurality of individually adjustable segments, slides for the operation of the totalizer arranged to adjust the segments aforesaid, said slides being normally locked from operation, hammers for said printing mechanism, individual locks for said hammers to be operated to release the hammers by the slides whereby the hammers are set by the slides aforesaid, a universal lock for said hammers, means for the release of said slides, means for the release of said universal lock, and separate means independent of each other for actuating said releasing means.

12. The combination with a totalizer, of printing mechanism embodying a plurality of individually adjustable segments, slides for the operation of the totalizer arranged to adjust the segments aforesaid, said slides being normally locked from operation, hammers for said printing mechanism, individual locks for said hammers to be operated to release the hammers by the slides whereby the hammers are set by the slides aforesaid, a universal lock for said hammers, and means for the release of said slides, means for the release of said universal lock at different periods during the operation of the machine, and separate means independent of one another for acuating said releasing means.

13. The combination with a totalizer, of printing mechanism embodying a plurality of individually adjustable segments, slides for the operation of the totalizer arranged to adjust the segments aforesaid, said slides being normally locked from operation, hammers for said printing mechanism, individual locks for said hammers arranged to be operated to release the hammers by the slides, whereby the hammers are set by the slides aforesaid, a universal lock for said hammers, a drive shaft, means operable from said drive shaft for releasing said slides thereby setting said printing mechanism, and means operable after the termination of the movement of the drive shaft for releasing the universal lock of the hammers.

14. The combination with a totalizer, of a printing mechanism embodying a plurality of independently adjustable slides, a plurality of hammers for said printing mechanism, an individual lock for each of said hammers, a universal lock for said hammers, slides arranged to operate said totalizer and adjust the segments of the printing mechanism and release the individual locks aforesaid, said slides being normally locked from operation, a drive shaft arranged to release said slides to set the printing mechanism and perform a calculation on the totalizer, and means independent of said drive shaft and operable subsequent to the calculation aforesaid for releasing said universal lock to release the hammers and operate the printing mechanism as set.

15. The combination with a totalizer, of a printing mechanism involving a plurality of individually adjustable segments, hammers for said printing mechanism, an individual lock for each hammer, a universal lock for all of said hammers, reciprocal slides for the operation of said totalizer arranged to set the segments aforesaid and release the individual locks for the hammers thereby setting the printing mechanism, said slides being normally locked from movement, a primary drive shaft, means for the release of said slides from said primary drive shaft, a secondary drive shaft operable after the completion of the movement of said primary drive shaft, and means operable from said secondary drive shaft for releasing the universal lock aforesaid.

16. The combination with a totalizer, of a printing mechanism embodying individually adjustable segments, a hammer for each of said segments, an individual lock for each hammer, a universal lock for all of said hammers, slides for the operation of said totalizer connected to said segments for the adjustment thereof and arranged to release the individual locks from the hammers aforesaid, a universal lock for all of said slides adapted to retain the same in their inoperative positions, a primary drive shaft arranged to operate said universal lock to release said slides, thereby performing a calculation on the totalizer and setting the printing mechanism by adjusting the segments and releasing the individual locks of the hammers, and a secondary drive shaft arranged to operate after the completion of the movement of the primary drive shaft and to release the universal lock and the hammers aforesaid for the operation of the printing mechanism.

17. The combination with a totalizer, of an operating mechanism therefor, a plurality of denominational keys arranged in series adapted to control the operating mechanism, an individual lock for each series of keys for retaining the depressed key of each series in such position, a lock for the operating mechanism individual to each key lock and carried thereby, and a universal lock for said operating mechanism.

18. The combination with a totalizer, of an operating mechanism therefor, a plurality of denominational keys arranged in series adapted to control the operating mechanism, an individual lock for each series of keys for retaining the depressed key of each series in such position, a lock for the operating mechanism individual to each key lock and carried thereby, a universal lock for said operating mechanism, and a drive shaft adapted to release the universal lock after the operation of the individual locks.

19. The combination with a primary drive shaft, a secondary drive shaft operable after the completion of the movement of said primary drive shaft, a totalizer operable during the movement of the primary drive shaft, and a printing mechanism operable from and during the movement of the secondary drive shaft.

20. The combination with a totalizer shaft, of a plurality of numeral wheels loosely mounted thereon, a rack coöperating with each numeral wheel, a train of gears likewise coöperating with each numeral wheel for the operation thereof, one gear of each train being bodily movable for engagement with the rack and normally disengaged therefrom, and means for moving said movable gears into engagement with their coöperating racks.

21. The combination with a totalizer shaft, of a plurality of numeral wheels loosely mounted thereon, a double rack coöperating with each numeral wheel, a train of gears likewise coöperating with each numeral wheel for the operation thereof, one gear of each train being bodily movable for engagement with the rack and normally disengaged therefrom, and means for moving said movable gears into one side or the other of their coöperating racks.

22. The combination with a totalizer shaft, of a plurality of numeral wheels loosely mounted thereon, a rack coöperating with each numeral wheel, a train of gears coöperating with each numeral wheel, a bodily movable gear secured to said shaft for each train of gears aforesaid, and means for oscillating said shaft to bring said bodily movable gears into mesh with their coöperating racks.

23. The combination with a totalizer shaft, of a plurality of numeral wheels loosely mounted thereon, a double rack coöperating with each numeral wheel, a train of gears coöperating with each numeral wheel, a bodily movable gear secured to said shaft for each train of gears aforesaid, and means for oscillating said shaft in either direction to bring said bodily movable gears into mesh with one side or the other of their coöperating racks.

24. The combination with a totalizer shaft, of a plurality of numeral wheels loosely mounted thereon, a double rack coöperating with each numeral wheel, a train of gears coöperating with each numeral wheel, a bodily movable gear secured to said shaft for each train of gears aforesaid, and means for oscillating said shaft in either direction to bring said bodily movable gears into mesh with one side or the other of their coöperating racks prior to any movement on the part of said racks.

25. The combination with a plurality of numeral wheels, of a truing wheel coöperating with each numeral wheel, a series of truing dogs, one for each truing wheel, and means for successively forcing said dogs into engagement with said coöperating truing wheels.

26. The combination with a plurality of numeral wheels, of a star wheel adapted to rotate with each numeral wheel, a truing dog alined with each star wheel, and a plurality of staggerdly arranged keys arranged to successively force said dogs into their coöperating star wheels.

27. The combination with a plurality of numeral wheels, of means for rotating said numeral wheels, a truing wheel coöperating with each numeral wheel, truing dogs coöperating with said wheels, and means for forcing said dogs successively into coöperation with their truing wheels subsequent to the completion of the movement of said numeral wheels.

28. The combination with a plurality of numeral wheels, of a pinion-carrying member coöperating with each numeral wheel, a pinion carried by said pinion-carrying member, and adapted to rotate the numeral wheel, a gear coacting with each numeral wheel, and means to transmit motion from said gear to said pinion-carrying member to shift the position of the axis of the pinion carried by said pinion-carrying member and thus rotate the numeral wheel.

29. In a device of the class described, a totalizer, operating means for said totalizer, a series of type members, actuating means for said type members, means for shifting said type members into locking engagement with said actuating means, and means connecting said totalizer operating means and said type shifting means.

30. In a device of the class described, a totalizer, operating means for said totalizer, a series of type members, actuating means for said type members, means for shifting said type members into locking engagement with said actuating means, means connecting said totalizer operating means and said type shifting means, and rigid means for holding said type members in retracted position when not engaged by said actuating means.

31. In a calculating machine, a driving device, computing mechanism driven by said device, said driving device being movable in reverse direction from an intermediate position of a stroke thereof but inoperative to repeat a portion of a cycle of movement of said computing mechanism, until the entire cycle of movement is completed.

32. In a calcuating machine, a driving device, computing mechanism, means for connecting said driving device with said computing mechanism to drive said computing mechanism, said connection being inoperative to cause reverse movement of said computing mechanism.

33. In a calculating machine, a driving device, computing mechanism having parts to be operated in sequence, driving connection between said driving device and said computing mechanism, said driving connection being inoperative to cause a movement belonging to a subsequent portion of the operation of said mechanism, until the previous portions of the movement of said mechanism have been completed.

34. In a calculating machine, a reciprocating driving device, computing mechanism having parts arranged to be driven in sequence, partially by a forward stroke of said driving device, and partially by the return stroke of said driving device, means for connecting said driving device with said computing mechanism, said connecting means being inoperative to cause movement of said computing mechanism on a return stroke of said driving device, until a forward stroke of said driving device has been completed.

35. In a calculating machine, an operating lever arranged for reciprocation, computing mechanism driven by said lever, said lever being movable in reverse direction from a position intermediate of said stroke but inoperative to drive said mechanism on return movement thereof, until a forward movement has been completed.

36. In a calculating machine, an operating lever arranged to move through forward and return strokes, computing mechanism, means for connecting said lever with said computing mechanism, to drive said mechanism through successive operations during the forward and return strokes of said lever, said connecting means being inoperative to drive said mechanism if return movement of said lever is begun prior to the completion of a forward stroke.

37. In a calculating machine, a main drive shaft, a supplementary drive shaft, a reciprocating handle arranged to operate said main shaft during the forward movement of said handle, and said supplementary shaft during the return movement of said handle, said handle being inoperative to drive said supplementary shaft during its return stroke, until a forward stroke of said handle has been completed.

38. In a calculating machine, a pair of independently rotatable drive shafts, computing mechanism arranged to be driven by said shafts, means for rotating said shafts successively, said rotating means being inoperative to drive one of said shafts, until a driving movement of the other of said shafts has been completed.

39. In a calculating machine, a pair of independently rotatable drive shafts, computing mechanism having parts arranged to be driven in sequence by said drive shafts, a reciprocating handle arranged to rotate said drive shafts on successive strokes of said handle, said handle being inoperative on a return stroke, until a forward stroke thereof has been completed.

40. In a calculating machine, a reciprocating operating handle, a main drive shaft, means for connecting said drive shaft with said handle, to be driven thereby during a forward stroke of said handle, a secondary drive shaft, means for connecting said secondary drive shaft with said handle, to be driven by said handle during the return stroke thereof, computing mechanism having parts arranged to be driven in sequence by the rotation of said drive shafts, said connecting mechanism being inoperative to connect said supplementary shaft with said handle, until said handle has completed a forward stroke to drive said primary drive shaft.

In testimony whereof I have signed my name to this specification, in the presence of two subscribing witnesses, on this 17th day of March, A. D. 1914.

OTTO MALCHER.

Witnesses:
CHARLES S. WILSON,
ALLENA OFFUTT.

Copies of this patent may be obtained for five cents each, by addressing the "Commissioner of Patents, Washington, D. C."